US005103655A

United States Patent [19]

Kano et al.

[11] Patent Number: 5,103,655

[45] Date of Patent: Apr. 14, 1992

[54] DIAGNOSTIC ARRANGEMENT FOR AUTOMOTIVE ENGINE EGR SYSTEM

[75] Inventors: Koichi Kano; Seiichi Otani; Junichi Furuya, all of Gunma, Japan

[73] Assignee: Japan Electronic Control Systems Company Limited, Isezaki, Japan

[21] Appl. No.: 539,824

[22] Filed: Jun. 19, 1990

[30] Foreign Application Priority Data

Jun. 19, 1989 [JP] Japan ................................ 1-154443

[51] Int. Cl.⁵ ........................................ G01M 15/00

[52] U.S. Cl. ................................................ 73/118.1

[58] Field of Search ................. 73/118.1, 117.2, 117.3; 340/438, 439

[56] References Cited

U.S. PATENT DOCUMENTS 4,715,348 12/1987 Kobayashi et al. ............ 364/431.06

4,825,841 5/1989 Norota et al. ....................... 123/571

*Primary Examiner*—Robert Raevis

*Attorney, Agent, or Firm*—Foley & Lardner

[57] ABSTRACT

When the engine throttle valve is closed or very nearly closed, the induction vacuum assumes a level whereat the flow of exhaust gas through the EGR conduit can be induced to assume a sonic level and maximize. Under these conditions, by opening the EGR control valve and checking the change in induction pressure, the amount of recirculation can be monitored in a manner which enables partial EGR conduit blockage and/or similar types of malfunctions to be detected.

7 Claims, 3 Drawing Sheets

DIAGNOSTIC ARRANGEMENT FOR AUTOMOTIVE ENGINE EGR SYSTEM

BACKGROUND OF THE INVENTION

1. Field of the Invention

The present invention relates generally to an automotive engine and more specifically to a diagnostic arrangement for an EGR (exhaust gas recirculation) system thereof.

2. Description of the Prior Art

In order to reduce the amount NOx emitted from an internal combustion engine, it is known to selectively recirculate a portion of the exhaust gases back from the exhaust system and to mix this portion with the air-fuel mixture in the induction system prior to its introduction into the combustion chamber(s) of the engine. This technique reduces the peak combustion temperature and attenuates the formation of nitrogen oxides.

However, in the event that the valve which controls the flow of exhaust gas through a conduit which interconnects the exhaust and induction systems malfunctions and remains constantly closed for example, the amount of NOx formed increases markedly. On the other hand, if the valve should malfunction in a manner to remain constantly open, an excess of exhaust gases is supplied into the induction system with the result that the engine surges and exhibits deteriorated performance.

Under the above circumstances, it is relatively easy for the vehicle user to determine whether a malfunction has occurred simply on the basis of the engine driving characteristics. However, if the conduit via which the exhaust gases are recirculated to the induction system becomes becomes soiled with soot and the like type carbonaceous deposits and partially restricts the flow of gas therethrough, the amount of NOx which is formed is increased by relatively small amounts and renders it is very difficult for the driver to detect this phenomenon simply from the engine performance characteristics.

In certain places such as the state of California (U.S.A.) which have rather strict engine emission standards, it has been proposed to implement regulations which obviate reliance on humanly perceivable operational characteristics and which require onboard diagnostic arrangements which monitor the operation of fuel injectors, oxygen sensors, catalytic converters and the like and alert the vehicle user to malfunctions, deterioration and the like type of trouble which leads to increases in noxious emission levels.

SUMMARY OF THE INVENTION

It is an object of the present invention to provide a diagnostic arrangement via which the operation of an engine EGR system can be monitored and the user alerted to undesirably deviations in the operational characteristics thereof.

In brief, the above object is achieved by an arrangement which takes advantage of the fact that when the engine throttle valve is closed or very nearly closed, the induction vacuum assumes a level whereat the flow of exhaust gas through the EGR conduit can be induced to assume a sonic level and maximize. Under these conditions, by opening the EGR control valve and checking the amount by which induction pressure changes, the amount of recirculation can be monitored in a manner which enables partial EGR conduit blockage and/or similar types of deterioration and/or malfunction to be detected.

More specifically, a first aspect of the present invention comes in an internal combustion engine which has an induction conduit; an exhaust conduit; an EGR conduit leading from the exhaust conduit to the induction conduit; a flow control valve disposed in the EGR conduit; means for detecting low engine load operation; an induction pressure sensor means for sensing the induction pressure prevailing downstream of the engine throttle valve; a servo motor operatively connected with the flow control valve; means responsive to the low engine load detecting means and the induction pressure sensor means for: controlling the servo motor in a manner which opens the flow control valve, monitoring the change in induction pressure as indicated by the induction pressure sensor means when the low engine load operation detecting means indicates that the engine is operating under a predetermined low load and a predetermined high induction vacuum is prevailing in the induction conduit, and indicating a malfunction when the change in pressure which occurs as a result of the opening of the EGR valve is below a predetermined level.

A second aspect of the present invention comes in an internal combustion engine having an induction conduit and an exhaust conduit, and an EGR system comprising: an EGR conduit which leads from the exhaust conduit to the induction conduit at a location downstream of the engine throttle valve; an EGR flow control valve disposed in the EGR conduit for controlling the flow of exhaust gas therethrough; a servo motor operatively connected with the EGR flow control valve; valve means for controlling the operation of the servo motor; a throttle valve position sensor operatively connected with the throttle valve in the induction conduit; an induction pressure sensor disposed in the induction conduit at a location downstream of the throttle valve; a control unit operatively connected with the throttle position sensor the induction pressure sensor and the valve means, the control unit including means for: detecting the throttle valve being closed beyond a predetermined amount; operating the valve means in a manner which induces the EGR flow control valve to open; monitoring the output of the induction pressure sensor and determining the change in induction pressure which occurs as a result of the opening of the EGR flow control valve; and diagnosing operational characteristics of the EGR system based on the change in induction pressure.

A third aspect of the present invention comes in a method of diagnosing the operational characteristics of an automotive EGR system, comprising the steps of: detecting conditions wherein a negative induction pressure of a predetermined magnitude will prevail in an automotive induction system; opening an EGR flow control valve; monitoring the change in induction pressure caused by the opening of the EGR flow control valve; and indicating an EGR system malfunction if the change in induction pressure deviates from a predetermined amount.

A further aspect of the present invention comes in an arrangement for diagnosing the operational characteristics of an automotive EGR system, comprising: means for detecting conditions wherein a negative induction pressure of a predetermined magnitude will prevail in an automotive induction system; means for opening an EGR flow control valve; means for monitoring the change in induction pressure caused by the opening of the EGR flow control valve; and means for indicating an EGR system malfunction if the change in induction pressure deviates from a predetermined amount.

DETAILED DESCRIPTION OF THE PREFERRED EMBODIMENTS

Figure 1:
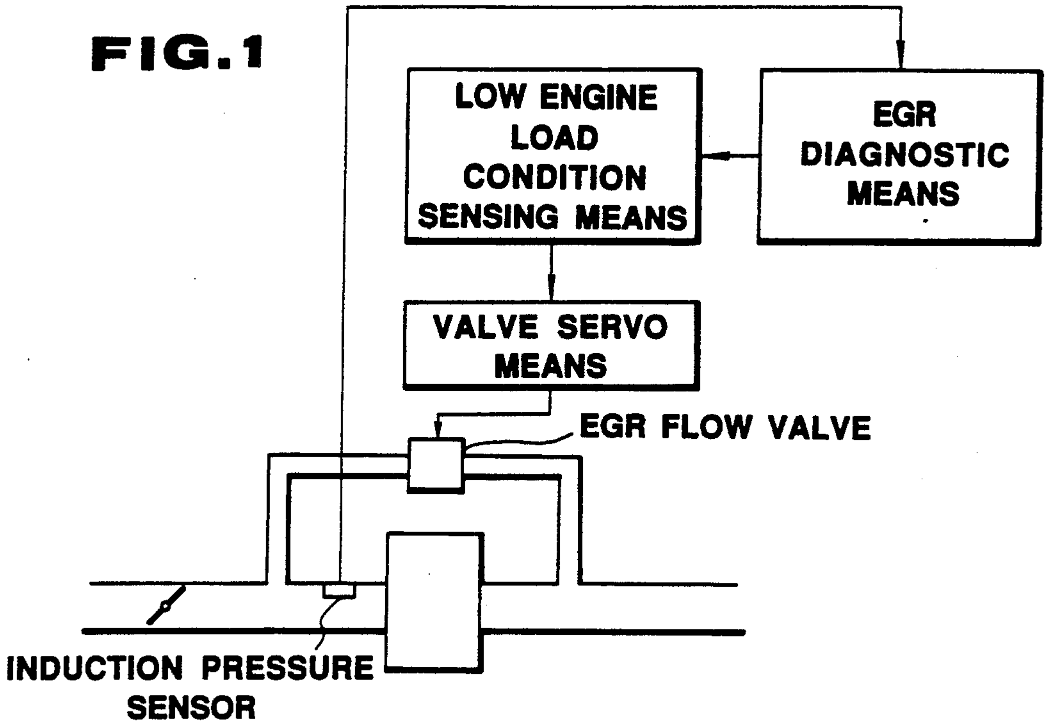
FIG. 1 is a schematically illustrates the conceptual arrangement of the present invention.
Figure 2:
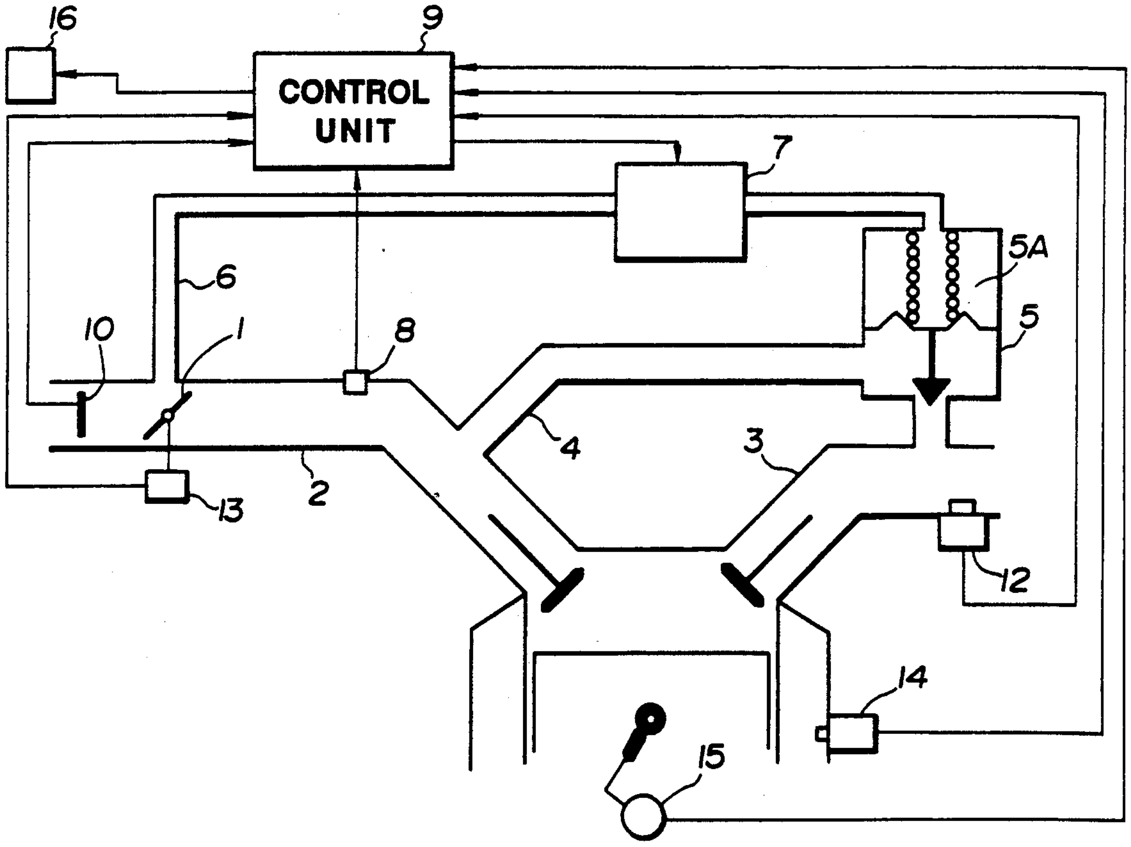
FIG. 2 is a schematic illustration showing the arrangement of an embodiment of the present invention.

FIG. 2 shows an embodiment of the present invention. In this arrangement a throttle valve 1 is arranged in the induction passage 2 upstream of the location at which an EGR conduit 4, which leads from an exhaust conduit 3, opens thereinto. A vacuum operated servo 5, which controls an EGR valve, is fluidly communicated with the induction conduit by way of a conduit 6. As shown, this conduit 6 communicates with the induction conduit immediately upstream of the throttle valve 1.

An electromagnetic valve 7 is disposed in conduit 6 and arranged to control the supply of vacuum from the induction conduit 2 to a vacuum chamber 5A of the servo 5.

An induction pressure sensor 8 is disposed in the induction conduit 2 at a location downstream of the throttle valve 1. The output of this sensor is supplied to a control unit 9 which in this instance includes a microprocessor or microcomputer.

The control unit 9 is further arranged to receive driving condition indicative data input from an air-flow meter 10 disposed in the induction conduit 2 at a location upstream of the throttle valve 1; an oxygen sensor 12 which is disposed in the exhaust conduit 3; a throttle valve position sensor 13; an engine coolant temperature sensor 14 and an engine speed sensor 15.

This data input permits the instant driving conditions to be ascertained and for the discrimination between low load driving conditions from intermediate and high speed/load conditions (by way of example).

The control unit 9 includes circuitry for controlling the operation of the electromagnetic valve 7 in a manner to control the amount of exhaust gas which is recirculated to the engine.

A display device 16 is operatively connected with the control unit 9 and arranged to be supplied with a signal in the event that a diagnosis of the EGR system indicates a malfunction and/or deterioration.

Figure 3:
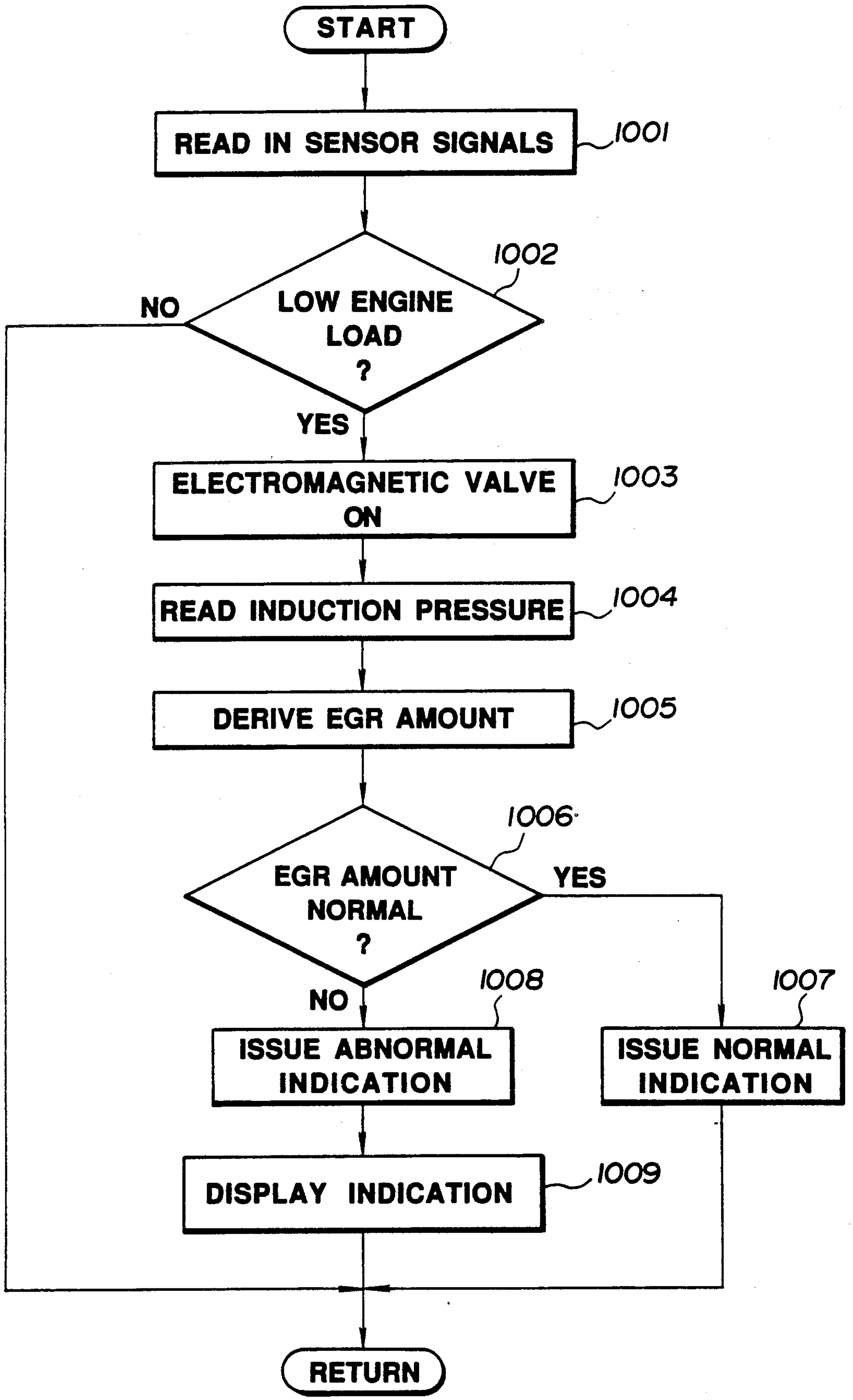
FIG. 3 is a flow chart depicting the steps which characterize the operation of the present invention.

FIG. 3 shows, in flow chart form, a diagnostic routine which is run in the microprocessor of the control unit 9. At step 1001 of this routine, the data from the various driving condition sensors are read in.

At step 1002 it is determined based on the data read in step 1001 if the engine is operating under low load conditions or not. If the outcome if this enquiry is negative, then the routine returns.

However, in the event that low speed driving conditions are detected, then at step 1003 the electromagnetic valve 7 is energized in a manner which induces the same to assume a fully open position and permit vacuum to be supplied to the vacuum chamber 5A. This induces the EGR valve to open and to permit exhaust gas from the exhaust conduit 3 to flow through the conduit 4 to the induction conduit 2.

Figure 4:
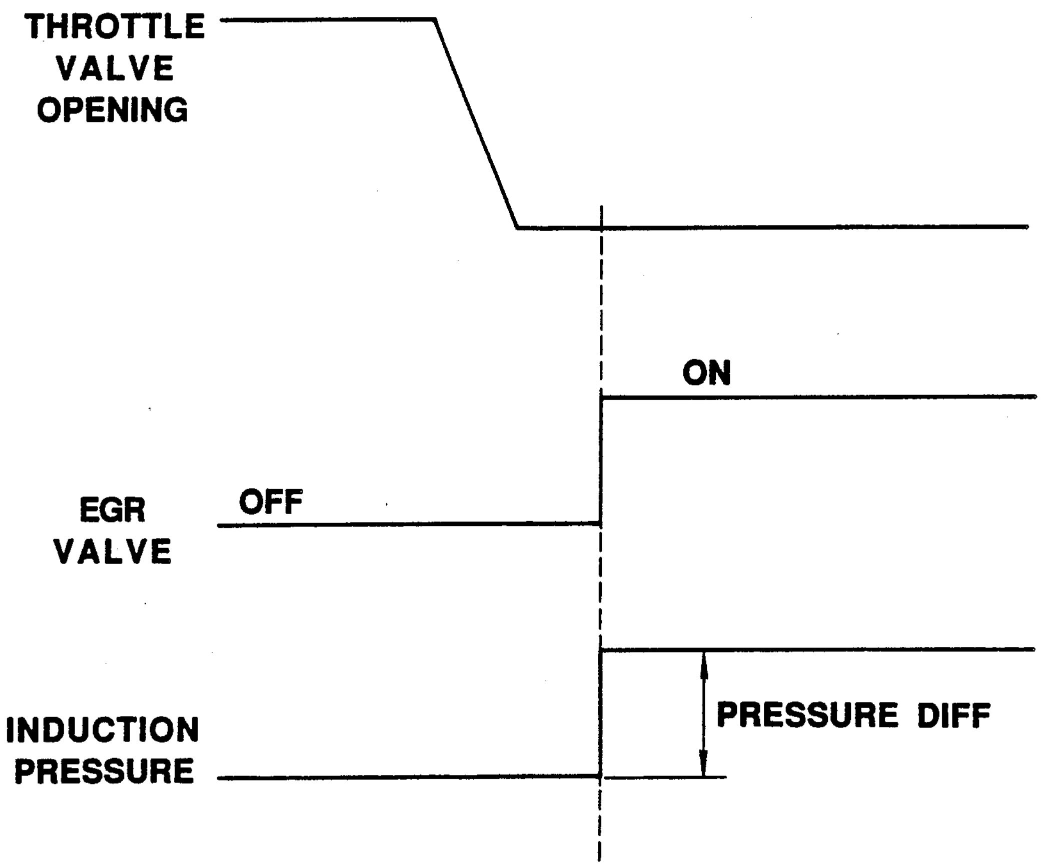
FIG. 4 is a timing chart which shows the changes which occur in induction pressure when EGR is implemented under low engine operation (as indicated by engine throttle valve position).

As step 1004 the output of the induction pressure sensor 8 is read and the influence of the valve energization induced in step 1003 is determined. In other words, the change in induction pressure (see FIG. 4) which occurs as a result of the introduction of the exhaust gas into the induction conduit 2 is determined. At step 1005 the amount by which the induction pressure has changed is used to determine how much exhaust gas is being recirculated.

At this stage it should be noted that, during low load operation, if the throttle valve is either fully closed or close thereto, the induction pressure (vacuum) tends to (depending on the engine speed) assume a very high value. In response to this high induction vacuum or pressure level, the flow of gas in the EGR conduit 6 assumes a sonic level. The exhaust gas recirculation flow efficiency rises, and the flow maximizes. Accordingly, it is possible to determine from the above mentioned induction pressure level how much exhaust gas should be recirculated. Generally speaking, the higher the induction pressure, the higher the amount of recirculation. The recirculation of a large amount of exhaust gas will have a marked effect on the induction pressure. Therefore, a large change in induction pressure can be taken as being indicative that a large amount of exhaust gas is being recirculated.

Accordingly, while the gas is flowing in the sonic region, it is possible to determine if the appropriate amount of gas is in fact passing through the conduit 6 for the given induction pressure or if the amount is reduced due to the cross-sectional area of the conduit 6 having been reduced by the accumulation of deposits therein.

At step 1006 it is determined if the change in induction pressure relative to the level prior the opening of the EGR valve is indicative of the correct amount of gas being recirculated or not. In the event that the pressure change is found to be insufficiently large, then the routine flows through steps 1008 and 1009, wherein a command to issue a signal to the display device 16 is issued.

It will be of course appreciated that the above described technique is a diagnostic one and that prolonged full opening of the EGR flow control valve under low throttle opening conditions is prevented. Merely by way of example the above testing can be carried out in less than a second. After the routine passes through either of steps 1007 or 1008, the opening status of the EGR flow control valve can be placed under a normal EGR control routine, and further running of the diagnostic one can be inhibited for a predetermined period e.g. 30 seconds–1 minute. This period can be set as desired to permit the condition of the EGR system to be spot checked at predetermined intervals while the throttle valve is closed and an adequately high induction pressure is present. Viz., in addition to the low load check it is possible to add an induction pressure check step to ensure that a sufficiently high induction vacuum is present to enable the diagnostic operation to be accurately carried out.

What is claimed is:

1. In an internal combustion engine
an induction conduit;
an exhaust conduit;

an EGR conduit leading from the exhaust conduit to the induction conduit;

a flow control valve disposed in the EGR conduit;

means for detecting low engine load operation;

an induction pressure sensor means for sensing the induction pressure prevailing downstream of the engine throttle valve;

a servo motor operatively connected with said flow control valve;

means, responsive to said low engine load detecting means and said induction pressure sensor means, for:

controlling said servo motor in a manner which opens said flow control valve, monitoring the change in induction pressure as indicated by said induction pressure sensor means when said low engine load operation detecting means indicates that the engine is operating under a predetermined low load, and a relatively high induction vacuum is prevailing in said induction conduit, and indicating a malfunction of at least one of said flow control valve, said EGR conduit, and said servo motor when the change in pressure which occurs as a result of the opening of said flow control valve is below a predetermined level.

2. In an internal combustion engine having an induction conduit having an engine throttle valve disposed therein, and an exhaust conduit, an EGR system comprising:

a) an EGR conduit which leads from the exhaust conduit to the induction conduit at a location downstream of the engine throttle valve;

b) an EGR flow control valve disposed in said EGR conduit for controlling the flow of exhaust gas therethrough;

c) a servo motor operatively connected with the EGR flow control valve;

d) an electromagnetic valve for controlling the operation of said servo motor;

e) a throttle valve position sensor which is operatively connected with the throttle valve in the induction conduit;

f) an induction pressure sensor disposed in the induction conduit at a location downstream of the throttle valve;

g) a control unit operatively connected with said throttle position sensor, said induction pressure sensor and said electromagnetic valve, said control unit including means for:

detecting the throttle valve being closed beyond a predetermined amount and determining whether the engine is operating under low load driving conditions;

operating said electromagnetic valve in a manner which induces said EGR flow control valve to open upon determining that the engine is operating under low load driving conditions;

monitoring the output of said induction pressure sensor and determining the change in induction pressure which occurs as a result of the opening of said EGR flow control valve; and diagnosing operational characteristics of the EGR system based on the change in induction pressure.

3. An EGR system as set forth in claim 2, wherein the diagnosing means further includes means for calculating a rate of EGR from the pressure difference between the intake pressures before and after the opening of the EGR flow control valve and determining means for determining if the EGR rate indicates a normal value for determining whether the EGR system has failed by determining whether the EGR rate does not indicate the normal value.

4. A method of diagnosing the operational characteristics of an automotive EGR system, comprising the steps of:

detecting conditions wherein a negative induction pressure of relatively high magnitude exists in an automotive induction system;

opening an EGR flow control valve;

monitoring the change in induction pressure caused by the opening of the EGR flow control valve; and calculating a rate of EGR from the pressure difference between the intake pressures before and after the opening of the EGR control valve;

determining whether the EGR system has failed by determining whether the EGR rate does not indicate a normal value;

indicating an EGR system malfunction if it is determined that said EGR rate does not indicate the normal value.

5. The method of claim 4, further comprising the step of determining whether the engine is operating under low load driving conditions, and wherein said step of opening said EGR flow control valve comprises the step of opening said EGR flow control valve upon determining that the engine is operating under low load driving conditions.

6. An arrangement for diagnosing the operational characteristics of an automotive EGR system, comprising:

means for detecting conditions wherein a negative inductive pressure of a relatively high magnitude exists in an automotive induction system;

means for opening an EGR flow control valve;

means for monitoring the change in induction pressure caused by the opening of the EGR flow control valve; and means for deriving a rate of EGR on the basis of the change in induction pressure caused by the opening of the EGR flow control valve and determining whether the EGR rate indicates a normal value, said deriving and determining means indicating a malfunction of the EGR system if the EGR rate does not indicate the normal value.

7. The arrangement of claim 6, further comprising means for determining whether the engine is operating under low load driving conditions, and wherein said means for opening said EGR flow control valve opens said EGR flow control valve upon determining that the engine is operating under low load driving conditions.

* * * * *